Oct. 18, 1949.    C. A. KOTTERMAN    2,485,450
RECTIFIER
Filed Oct. 24, 1946
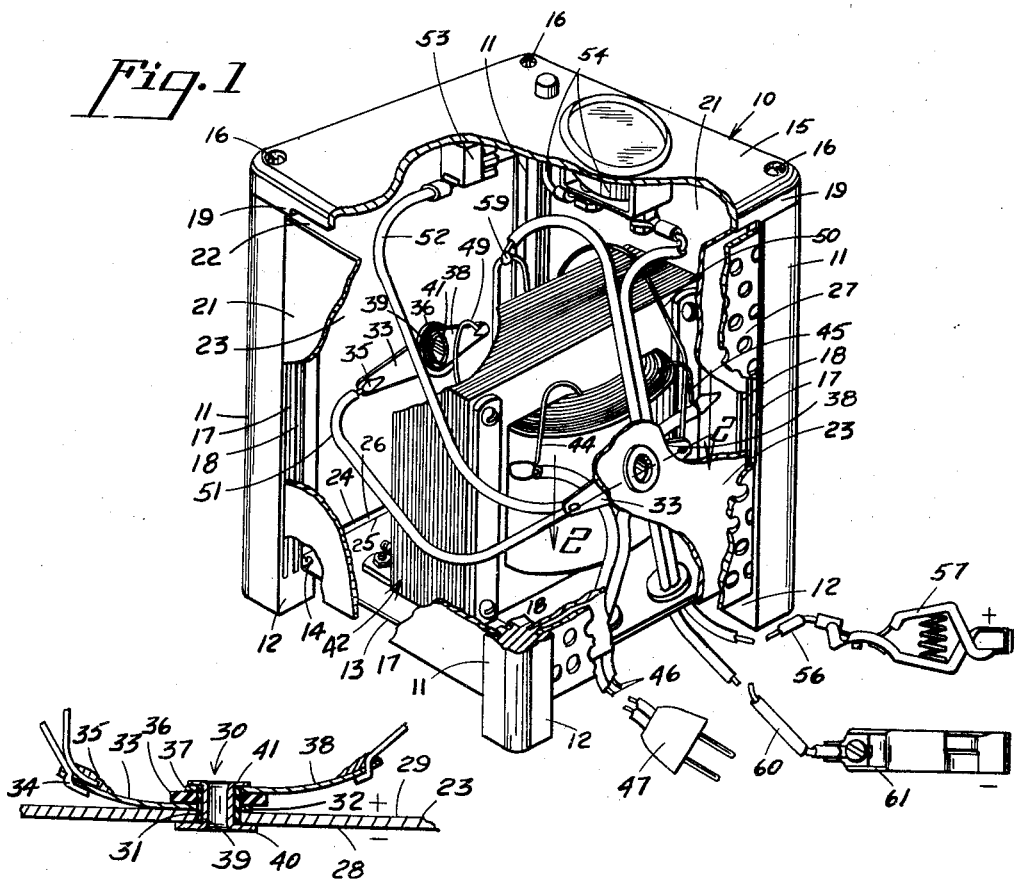
Fig. 1
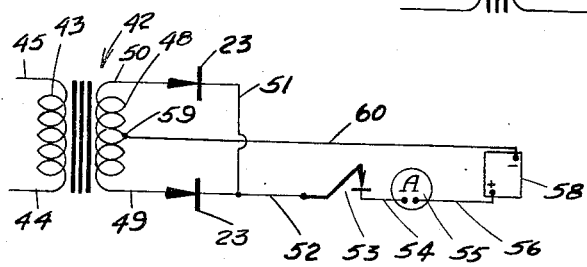
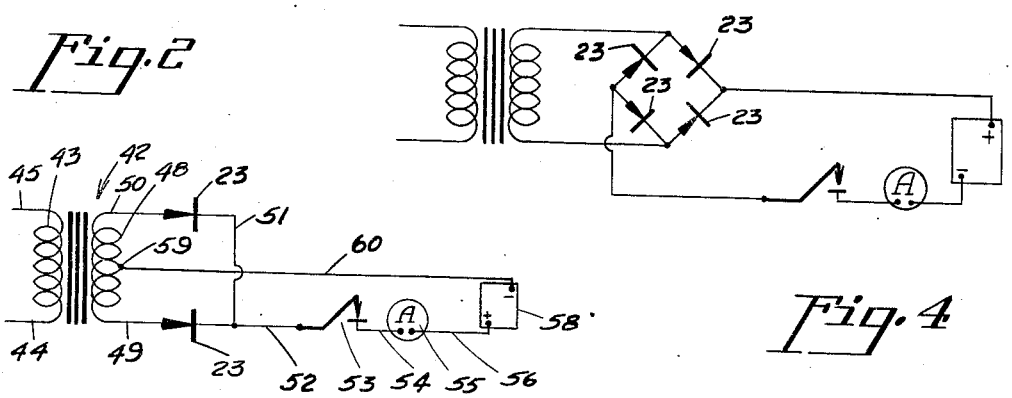
Fig. 2
Fig. 3
Fig. 4
INVENTOR.
Chester A. Kotterman
BY
Murray, Sachhoff & Paddack
ATTY's.

Patented Oct. 18, 1949

2,485,450

UNITED STATES PATENT OFFICE 2,485,450

RECTIFIER

Chester A. Kotterman, New York, N. Y., assignor to Schauer Machine Company, Cincinnati, Ohio, a firm Application October 24, 1946, Serial No. 705,287

10 Claims. (Cl. 321—8)

The present invention relates to electrical current rectifiers, and particularly to devices employing metal-plate surface contact rectifying elements.

An object of the invention is to provide electric current rectifiers of the type referred to having increased current rectifying capacity in proportion to the surface area of the rectifying elements employed therein.

Still another object of the invention is to provide an arrangement of rectifier elements in a rectifying device of the class described to attain improved heat transfer from rectifying elements to surrounding air and to thereby enable the rectifying elements to handle larger rectified currents without promoting early destruction of the rectifying elements in the device.

A further object of the invention is to provide a simply constructed and easily assembled arrangement of parts including a simple and efficient mounting for the elements.

A still further object of the invention is to provide a simple, inexpensive, and very effective connector terminal for the metal-plate rectifying elements.

These and other objects are attained by the means described herein and exemplified in the accompanying drawings in which:

Fig. 1 is a perspective view of an electric current rectifier embodying the invention, parts being broken away to disclose the arrangement of the components of the rectifier and the mounting of the metal-plate rectifying elements.

Fig. 2 is a cross-sectional view taken on line 2—2 of Fig. 1.

Fig 3 is a wiring diagram of the center tap circuit rectifier shown in Fig. 1.

Fig. 4 is a wiring diagram for a modified form of rectifier embodying the invention, showing a full-wave bridge rectifier.

In metal-plate rectifiers of the copper oxide, copper sulphide or selenium types, the individual rectifying elements are usually mounted together in stack assembly form. In many heretofore known devices these rectifier stack assemblies are a major component in the rectifier equipment, being associated with the other necessary components such as a transformer, meter, tap-changing switch etc. depending upon the use for which the completed rectifier equipment is intended. The components are grouped together and enclosed in some manner of housing or container closure.

Metal-plate rectifiers generate heat during operation and this heat must be removed from the rectifier to prevent self-destruction thereof. This has been accomplished heretofore by direct radiation to the air surrounding the rectifier stack or stacks and is known as convection cooling. In some instances the heat transfer is improved and accelerated by ventilating the enclosed housing for the rectifier or by employing forced-draft ventilation embodying some manner of fan. According to the method and means of the present invention the use of stack assembled individual rectifying elements is eliminated and single plate rectifying elements of somewhat larger size and selected shape are used as wall elements of the cabinet or housing ordinarily used to contain the rectifier. In all arrangements of the structures of the invention one individual rectifying plate element is connected in series per arm of the rectifying circuit of the device. By so using the rectifier plate elements as walls of the cabinet, there is attained a maximum heat transfer from the rectifier to the ambient air so that the single rectifier plate is kept at a reduced temperature without the aid of auxiliary cooling devices and its capacity for delivering rectified current without danger of destructive heating is greater than the same surface area of metal-plate rectifiers of similar plate rectifier elements in stack assembled form.

The method and means of the invention hereinafter described are particularly advantageous in the construction of rectifier equipment using the selenium type of metal-plate rectifier in view of the fact that the active rectifying area of a selenium rectifier covers substantially the entire surface of the supporting or base plate of the rectifying element. It will be understood however, in the following description that other types of metal-plate rectifying elements may likewise be advantageously employed by the use of the same method and means.

Reference is now made to Fig. 1 which shows, in perspective, a typical example of an electric current rectifier construction according to the method and means of the invention and represents a rectifier embodying a center tap circuit and having an output voltage of 8 to 9 volts, for example, and useful for charging a 6-volt battery and other low voltage, D. C. applications.

The assembled rectifier apparatus comprises a casing indicated generally by the reference numeral 10 and is in this instance made up of four corner posts 11 of electrical insulating material which are L-shaped in cross-section from the top to the bottom of the housing or closure to be formed thereby. The lower terminal ends 12 of the posts are substantially rectangular in cross-section to form feet on the tops of which are supported the four corners of a metal bottom wall 13 secured to the respective feet 12 by means of screws 14. A top cover cap 15, which may be of molded insulating material, is secured to the top ends of the corner posts by fastening means such as screws 16.

In the adjacent faces of adjacent corner posts 11 are parallel grooves 17 and 18 which terminate at the lower end substantially at the level of the bottom wall 13. Rectangular plates may be entered into a pair of the slots 17 or a pair of slots 18 in adjacent corner posts as an easily insertable and removable side wall for the housing structure 10. On the bottom face of cap 15, at the four corners thereof are depending foot-like extensions 19 which close the tops of the slots 17 and 18 in each of the corner posts and provide a ventilating gap 22 between the top of a metal side wall 21 and the bottom edge of cap 15 intermediate each pair of corner posts.

In the embodiment here under consideration, as will be fully understood from Figs. 1 and 3 provision is made for full wave rectification in a circuit embodying one individual selenium plate rectifier element 23 per arm of the circuit. The rectifying elements 23 are of a length and width such that they may be entered in opposed slots 18 of adjacent posts and serve as a structural side wall for the casing or box 10. The lower edge 24 of element 23 is thus spaced and insulated from the adjacent edge 25 of the metal bottom wall 13 by an air gap 26, said bottom wall and rectifier elements being insulated by the material of the corner posts with which they are both connected. The full wave center tap rectifier utilizes two rectifier elements 23 and the selenium plates are therefore inserted on two sides of the cabinet only. As shown herein the selenium rectifier plates 23 are mounted as wall elements for opposed sides of casing 10, while the remaining opposed walls 21 intermediate the selenium rectifier elements are merely structural elements formed, for example, of sheet metal of suitable strength and incidentally of a thickness to slidably fit in the opposed grooves 17 of the supporting corner posts 11.

From the description thus far it will be readily appreciated that by the elimination of stack assembled rectifying elements and by using the single individual metal-plate rectifier elements as walls for the cabinet, the size of the cabinet may, in most instances, be materially reduced, better cooling of the rectifying elements will be achieved and the hollow interior thereof will afford ample room for the encased components which are supported, variously, and according to the principles of good construction on the bottom wall 13 and on the top cap 15.

The dimensions of this plate or wall are such as to leave a gap 26 between the inner surface of wall 21 or rectifying element 23 and the outer edges of wall 13 thus permitting free air to pass through the gap, upwards and out through the slots 22. These slots permit cooling air to enter through gaps 26 to pass around the transformer 42 and along the inner surfaces of 21 or 23 thus helping to cool both the rectifying element 23 and the transformer 42. Holes (not shown) could also be pierced in plate 13 to augment this cooling action.

In order to protect the individual plate rectifier elements against accidental contact and connection with ground, a suitable protective screen of reticulated material such as perforated metal plate 27 is mounted in spaced parallelism with the metal-plate rectifier element 23 and is mounted in opposed grooves or slots 17. This construction admits of easy and rapid assembly with ready adaptability to the use of a selected number of individual rectifier plate elements as will be hereinafter fully understood.

The individual plate rectifier elements 23 forming the selected walls of casing 10 are desirably disposed with the base plate and selenium side 28 as the outside and negative electrode wall. The sprayed alloy face 29 of plate 23 constitutes the inside and positive electrode.

In order to simplify and expedite the manufacture of the plate rectifier elements and to simplify and expedite the electrical connection thereof with the other electrical components housed within the casing 10, a novel form of connector assembly indicated generally at 30 is provided for each individual metal-plate rectifier element 23. Substantially centered between the top, bottom and sides of plate 23 is a circular hole into which an insulating tubular bushing 31 is snugly fitted, one end of the bushing being flush with the face 28. The length of the bushing 31 is considerably greater than the thickness of plate 23 and a sheet metal terminal 32 perforated to slidably receive the bushing 31, is pressed over the bushing and into contact with the positive face 29 of plate 23. The positive terminal 32 has an elongated finger or lug 33 integral therewith and preferably extended toward one of the vertical edges of the plate 23, and is adapted at its free end for connection with an electrical conductor wire in any suitable fashion as by providing it with a perforation 34 permitting insertion of the wire and a subsequent solder connection 35. Superposed on connector 32 is an insulating washer 36 which also snugly fits on insulating bushing 31. On top of insulating washer 36 is a wire connector terminal member 37 similar to the member 32 and insulated from it. The lug or integral finger 38 is desirably extended in diametrically opposite direction from the corresponding lug 33 of the connector 32. The terminal connector assembly thus far described is rigidly secured in position and the connector 38 is placed in electrical continuity with the face 28 of plate 23 by means of a tubular rivet 39 of metal of good electrical conductivity. The rivet 39 fits snugly within the insulating bushing 31 and the flange 40 of the rivet is pressed into good surface contact with that portion of face 28 surrounding the end of bushing 31. The rivet is fastened by turning the flange 41 at the opposite end over into positive binding engagement and electrical continuity with the top face of member 37 surrounding the adjacent end of insulating bushing 31. It will be seen that the connector lugs of opposite polarity corresponding to the opposite faces of plate 23 are both arranged compactly and accessibly on a common face of plate 23.

Reference is now made to Figs. 1 and 3 and a description of the specific full wave center tap rectification circuit and electrical components embodied in the illustrated apparatus. A transformer indicated generally at 42 is secured in known fashion to the bottom wall 13 and the primary winding 43 thereof has its opposite ends 44 and 45 electrically connected with insulated conductors 46 which pass through the bottom wall 13 to the exterior of the casing 10 and are provided with any selected or conventional plug 47 whereby the primary is connected with a source of alternating current. The transformer secondary winding 48 has its opposite ends 49 and 50 electrically connected to the lugs 38 of the respective plates 25 thereby placing them in electrical connection with the outer or negative face or electrode 28 of the plate 23. The remaining connector lugs 33 are connected together by a common conductor 51 so that the rectified current from the positive electrode face of plate 23 is conducted therethrough and through a conductor 52 to a thermal-circuit breaker 53 from whence the current passes through conductor 54 to ammeter 55 and from thence through the positive outlet lead 56 which, in this instance, is provided with a spring clip type terminal 57 whereby the positive side of the rectified current may be connected to any D. C. current utilizing instrumentality such as a storage battery 58. The center tap 59 of secondary winding 48, i. e. the negative side of the transformer-rectifier circuit, has connected thereto a suitable conductor 60 which carries the negative D. C. output terminal 61.

It will be observed of the hereinbefore described structure that the side walls 21 and 23 comprising non-rectifying and rectifying elements are insulated one from another with a sufficient insulating path between them. If it be desired to modify the structure of materials to utilize metal for the corner posts, this change would involve merely the well understood interposition of insulation between the edges of the metal-plate rectifying elements and the grooves or slots, however formed, in which the elements are supported. Likewise the various components, including tap-changing switches, etc. as required may be desirably mounted on the insulating top member or cap 15.

In the event rectifier equipment be required to deliver a greater D. C. voltage, for example, 18 volts D. C. from a 110 volt A. C. source, one of the rectifier plates 23 would be used for each of the four walls of the cabinet 10 and one of said individual rectifying elements would be connected in series per arm of the four arms of the full-wave single-phase bridge type rectifier as conventionally shown in the wiring diagram of Fig. 4. The physical difference of the resultant rectifier would involve merely the installation of the individual rectifier elements in each pair of grooves 18 in the manner shown fragmentally at the right hand side of Fig. 1 and the provision of an accompanying protective screen 27 in lieu of the imperforate non-rectifying wall 21 of Fig. 1.

It is to be understood that the arrangement, as exemplified in Fig. 1, may be subject to variation as to the number of rectifier walls employed to suit the desired output voltage and current capacity and the type of transformer connection required. For example, if more current is required than can be rectified by using a single plate per arm in the center-tap circuit, then two other walls can be made of rectifier plates, each pair of walls being connected in parallel, thus doubling the rectified current capacity.

As another modification the four rectifier walls of a square casing, as shown, may be connected in series or parallel in a half-wave rectifier circuit. In any event one or more walls of the device would be constituted by and used as rectifier elements, the other walls being purely for space closing purposes and having no rectifying function or utility.

In constructing a three-phase rectifier the housing may be made hexagonal in shape and alternate of the six side walls or all of them may be constituted by rectifying plate elements connected in known manner and following the general procedure hereinbefore explained and which will be readily understood by those versed in the art.

It will be understood that while it is preferred to arrange for the disposition of the wire connector terminals 33 and 38 on a common side (interiorly of the casing), the major advantages of the invention may be attained by providing a terminal on each of the opposite major faces and by extending the conductor wire from the exteriorly disposed face of the rectifier element alongside the plate and between it and the foraminous screen 27 and thence in any desirable manner to complete the desired connection between the remaining end of the conductor wire and terminal of one of the other components of the rectifier apparatus.

What is claimed is:

1. In an electrical current rectifier of the metal plate variety, the combination of a bottom wall, a plurality of spaced upright posts supporting the bottom wall at a distance from the lower ends of said uprights, a plurality of side wall elements each supported on opposite sides by adjacent pairs of uprights and having their bottom edges spaced from the side edges of the bottom wall, a top wall supported by the tops of said uprights and having its side edges in spaced relation to the top edges of the side walls, at least one of said side walls being an individual metal plate rectifying element, a transformer inaccessibly enclosed by the bottom wall, side walls and top wall, the said transformer comprising a secondary winding having terminals, and conductors electrically connected to opposite major faces of the metal plate rectifying element, certain of said conductors being electrically connected to certain terminals on the transformer secondary winding in known manner to complete a selected rectifier circuit.

2. In an electrical current rectifier of the metal plate variety, the combination of a bottom wall, a plurality of spaced upright posts supporting the bottom wall at a distance from the lower ends of said uprights, a plurality of side wall elements each supported on opposite sides by adjacent pairs of uprights and having their bottom edges spaced from the side edges of the bottom wall, a top wall supported by the tops of said uprights and having its side edges in spaced relation to the top edges of the side walls, at least one of said side walls being an individual metal plate rectifying element, the metal plate rectifying side wall supported in electrically insulated relation to its supporting uprights and the remaining walls of the device, a transformer inaccessibly enclosed by the bottom wall, side walls and top wall, the said transformer comprising a secondary winding having terminals, and conductors electrically connected to opposite major faces of the metal plate rectifying element, at least one of said conductors being electrically connected to a terminal on the transformer secondary winding.

3. In an electrical current rectifier of the metal plate variety, the combination of a bottom wall, a plurality of spaced upright posts supporting the bottom wall at a distance from the lower ends of said uprights, a plurality of side wall elements each supported on opposite sides by adjacent pairs of uprights and having their bottom edges spaced from the side edges of the bottom wall, a top wall supported by the tops of said uprights and having its side edges in spaced relation to the top edges of the side walls, at least one of said side walls being an individual metal plate rectifying element, the metal plate rectifying side wall supported in electrically insulated relation to its supporting uprights and the remaining walls of the device, a transformer inaccessibly enclosed by the bottom wall, side walls and top wall, the said transformer comprising a secondary winding having terminals, and conductors connected to opposite major faces of each metal plate rectifying element, at least one of said conductors being electrically connected to a terminal of the transformer secondary winding, the conductor which is connected to the external major face of the metal plate rectifying element being passed in electrically insulated relation through the thickness of the element into the interior of the enclosing structure.

4. In an electrical current rectifier of the metal plate variety, the combination of a bottom wall, a plurality of spaced upright posts supporting the bottom wall at a distance from the lower ends of said uprights, a plurality of side wall elements each supported on opposite sides by adjacent pairs of uprights and having their bottom edges spaced from the side edges of the bottom wall, a top wall supported by the tops of said uprights and having its side edges in spaced relation to the top edges of the side walls, at least one of said side walls being an individual metal plate rectifying element, the metal plate rectifying side wall supported in electrically insulated relation to its supporting uprights and the remaining walls of the device, a transformer inaccessibly enclosed by the bottom wall, side walls and top wall, the said transformer comprising a secondary winding having terminals, and conductors connected to opposite major faces of the metal plate rectifying element, at least one of said conductors being electrically connected to a terminal of the transformer secondary winding, and a protective screen mounted exteriorly and in electrically insulated relation to the metal plate rectifying element.

5. In an electrical current rectifier device the combination of a casing comprising a bottom wall, a top wall, and a plurality of side walls, the top and bottom edges of which are spaced from the side edges of the top and bottom walls to provide ventilating slots, certain of said side walls consisting of individual metal plate rectifying elements, each of such elements being supported in electrically insulated relation from the remaining walls of the casing and further provided with a perforation intermediate its edges, an insulating bushing in said perforation, an electric conductor sleeve disposed within the insulating bushing and having a flange on one end in electrical continuity with the external major face of the element, a terminal mounted interiorly of the casing on the opposite end of said conductor sleeve, and a second terminal secured in electrical continuity with the interior face of said element and in insulated relation to said conductor bushing and the first mentioned terminal.

6. In an electrical current rectifier device the combination of a casing comprising a bottom wall, a top wall, and a plurality of side walls, the top and bottom edges of which sidewalls are spaced from the side edges of the top and bottom walls to provide ventilating slots, certain of said side walls consisting of individual metal plate rectifying elements, each of such elements being supported in electrically insulated relation from the remaining walls of the casing and further provided with a perforation intermediate its edges, an insulating bushing in said perforation, an electric conductor sleeve disposed within the insulating bushing and having a flange on one end in electrical continuity with the external major face of the element, a terminal mounted interiorly of the casing on the opposite end of said conductor sleeve, a second conductor terminal secured in electrical continuity with the interior face of said element and in insulated relation to said conductor sleeve, and an electrical transformer mounted interiorly of the casing and provided with a secondary winding connected in predetermined manner with terminals of each metal plate rectifying side wall element.

7. In a metal plate rectifier apparatus, the combination of a casing for housing components of the apparatus, each rectifier element of the apparatus serving as a wall of the casing and spacedly related to the remainder of the casing at its top and bottom edges to provide for ventilation and automatic cooling of the apparatus.

8. In a metal plate rectifier apparatus, the combination of a casing having a plurality of walls and adapted for housing the components of the device, each sidewall comprised of a single metal plate rectifying element which serves also as one arm of a full-wave bridge, single phase rectifier.

9. In a metal plate rectifier apparatus, the combination of a housing for components of the device and comprising top and bottom walls and four sidewalls, each side wall comprised of a single metal plate rectifying element which serves also as one arm of a full-wave bridge, single phase rectifier.

10. In a metal plate rectifier apparatus, the combination of a casing comprising four sidewalls and adapted for housing the components of the device, including a transformer having a center-tappped secondary winding, two of said sidewalls comprised each of a single metal plate rectifying element which also serves as one arm of a full-wave, center-tapped, single phase rectifier circuit.

CHESTER A. KOTTERMAN.

REFERENCES CITED

The following references are of record in the file of this patent:

UNITED STATES PATENTS

| Number | Name | Date |
|---|---|---|
| 1,641,395 | Moore | Sept. 6, 1927 |
| 2,171,643 | Brenkert | Sept. 5, 1939 |
| 2,179,137 | Stevens et al. | Nov. 7, 1939 |
| 2,353,461 | Hamann | July 11, 1944 |
| 2,412,989 | Kotterman | Dec. 24, 1946 |

OTHER REFERENCES

Ser. No. 395,875, Lange et al. (A. P. C.) pub. May 18, 1943.